Patented Feb. 23, 1937

2,071,549

UNITED STATES PATENT OFFICE 2,071,549

METHOD OF MANUFACTURING ABRASIVE ARTICLES

Osborne L. Mahlman, Kenmore, N. Y., assignor, by mesne assignments, to The Carborundum Company, Niagara Falls, N. Y., a corporation of Delaware No Drawing. Application May 19, 1936, Serial No. 80,578

8 Claims. (Cl. 51—278)

This invention relates to a method of manufacturing abrasive coated articles wherein abrasive grains are attached in a substantially single layer to a backing. More particularly the invention is concerned with a method of manufacturing abrasive coated products wherein the adhesive which is used to attach the grains to the backing comprises essentially a heat-hardenable resin.

In a copending application Serial No. 693,395, filed October 12, 1933, there is described a method of making abrasive coated products wherein a backing material is first coated with a heat-hardenable resinous liquid, such as a normally liquid heat-hardenable phenolic condensation product. A loose mass of abrasive grains individually coated with a heat-hardenable resin is prepared and applied to the liquid coated backing. The thus prepared article is heated to soften the resinous coating on the abrasive grains, hardening the liquid coating on the backing, and causing a welding between the resin coatings on the grains and the hardened liquid on the backing whereby the grains are firmly attached to the backing. This method has been found satisfactory for a number of purposes. It has been found, however, that when this method is employed the resin coatings on the grains, which completely surround and enclose the grains, tend to remain in place about the grains. As a consequence the welding between the resin coatings on the grains and the liquid on the backing occurs only at the juncture of the grain and the liquid and a substantial part of the resin on the grains remains about the outer or grinding surfaces of the grains. This detracts somewhat from the value of the article because the sharp and hard surfaces of the grains are at least temporarily covered up by the resin coatings which must be removed in use before the grains are exposed, and furthermore this resin is of no value in attaching the grains to the backing and is therefore wasted so far as any use as a binder is concerned.

It is an object of this invention to provide a method which will overcome these objections. Another object is to provide a method for manufacturing coated abrasive articles containing a resinous binder for attaching abrasive grains to a backing which will utilize substantially all of the resinous material for binding the grains to the backing. Still another object of the invention is to provide a method for making abrasive coated products wherein the abrasive grains are firmly attached to a backing by a heat-hardened resin and the outer or grinding surfaces of the grains are substantially free from resinous material.

An understanding of my invention will be facilitated by a brief discussion of resins and their mode of reaction. In considering this discussion, it is to be understood that the particular materials and reactions discussed are referred to by way of example and that the invention is not limited to the particular materials here discussed, but may be practiced broadly as defined in the claims.

It is well known that when a phenol and methylene body, such as formaldehyde, paraformaldehyde, hexamethylenetetramine, or other aldehydes such as furfural or benzaldehyde are heated together in stoichiometric proportions, there is first formed an oily liquid which upon continued heating becomes solid. The solid initially formed is fusible and soluble in such common solvents as alcohol and acetone and upon continued heating is gradually converted through the so-called "B" stage where the resin softens when heated but does not fuse and finally reaches the so-called "C" stage where the product is substantially infusible and insoluble. If instead of using stoichiometric proportions, the phenolic body and the methylene body are used in other proportions, as for example an excess of phenol, a solid product is obtained which is resinous in character, is soluble and fusible, and can be repeatedly heated and cooled without effecting further reaction to the "B" stage or "C" stage. These permanently fusible products are commonly made and are spoken of in the literature as "Novolaks". Where they contain an excess of phenol they may be made heat reactive by adding a methylene body. In carrying out my invention I take advantage of these properties of resins by coating abrasive grains with a permanently fusible type of resin as described above and coating a backing with a liquid containing the reactive ingredient which is deficient in the coating on the grains. For example, I may coat the grains with the "Novolak", which is permanently fusible because it contains an excess of a phenol, and supply the methylene body which is required to make the "Novolak" heat reactive in the liquid material which is put on the backing. The converse method may also be used by supplying the excess of methylene body in the coating on the grains and using a liquid containing an excess of a phenol.

Having applied a coating of resin coated grains to the liquid coated backing, I heat the article so prepared whereupon the resin coatings on the abrasive grains, being readily fusible, melt and flow off the grains onto the backing. The mixture thus formed of liquid on the backing with the originally solid resin on the grains contains reactive proportions of phenol and methylene bodies and upon continued heating the binder thus formed is converted to the infusible, insoluble condition. At the same time the outer surfaces of the abrasive grains, which are exposed above the layer of binder, are substantially free from resin and are in the best condition for abrading. My method therefore provides an article containing abrasive grains attached to a backing by a heat-hardened resinous product, the outer surfaces of the grains being substantially free from resinous binder.

In comparison with the articles made by the method wherein the usual heat-hardenable resin is applied to the grains, my articles are sharper. My method also utilizes all of the resinous material to bind the grains to the backing. This is not true of the methods heretofore used because articles produced by those methods contain a substantial quantity of resin on the tops of the abrasive grains. This distinction applies equally to articles made by the use of grains coated with a heat-hardenable resin as described above and to articles prepared by the conventional method of first coating a backing with a liquid adhesive, applying a coating of grains, and then applying a second or sizing coating of liquid adhesive over the grains.

My invention is adapted to be carried out by any of the usual coating methods. For example, a traveling web of a backing material may be coated by passing a web over a rotating roller immersed in a vat of adhesive and then distributing the coated grains onto the liquid coated backing as by feeding them from a hopper in a conventional manner. Where abrasive disks are to be manufactured, the use of which involves only a ring or band of abrasive extending inward from the periphery of the disk, the invention may be practiced by first stamping out disks of backing material, coating a ring or band of suitable width with a liquid adhesive, adding the coated grains, removing any excess grain as by inverting the article, and then heating the article to cause the resin coatings on the grains to flow onto the backing and to cause reaction of the binder whereby it is heat-hardened and the grains are adhesively attached to the backing.

The coatings on the abrasive grains may be applied in any conventional manner. Since I utilize a resin which is permanently fusible and which does not harden upon heating, a convenient method for coating the grains consists in merely melting up the resin, which may be in lump form, and stirring the grains through it to distribute it over the surfaces of the grains. The mixture may be continually agitated while it is being cured so as to prevent agglomeration of the grains, or the mass may be coated without agitation and subsequently broken up to obtain a loose mass of substantially individual grains. Alternatively the resin which is to be put on the grains may first be pulverized and the grains may then be coated by well known methods, such as by wetting them with a liquid, stirring the wetted mass with the pulverized binder to obtain a loose mixture, the individual grains of which are surrounded by the pulverized resin, and then heating the thus coated grains in separated condition to fuse the resin about the grains. While such a method is commonly practiced in coating grains with a heat-hardenable resin, it is one of the advantages of my invention that the permanently fusible resin which I use on the grains can be readily applied to the grains by melting the resin. This method obviates the necessity for pulverizing the resin, which is a somewhat expensive operation, and makes it possible to coat the grain with resin of known composition unadulterated by liquid wetting agents.

As will appear from a consideration of my improved method, my invention has a number of advantages over the methods heretofore used. As just stated, the invention makes it possible to employ lump resin which is considerably cheaper than finely pulverized resin. In comparison with the older methods where liquid adhesives only are used, my invention dispenses with one of the steps of coating with a liquid. Since it is customary to heat treat articles after the grain has been applied and before the second or sizing coating of liquid has been added, the elimination of this sizing coat dispenses with a heating operation as well as with a coating operation. Furthermore the method provides articles which are sharper and free cutting from the start, whereas the articles of the prior art require a preliminary run to remove the resin from the top of the grains before the grains themselves are exposed. My method also effects a saving in resin because the resin which is applied is all utilized for attaching the grains to the backing. This is not true of the methods heretofore used.

The invention is adapted to a number of modifications such as the inclusion of inert fillers in the liquid coating. Any suitable backing may be employed, such as paper, cloth, flexible steel, or for that matter, non-flexible backings such as thick steel or wood. The liquid coating may be a solution of a heat-hardenable resin in a suitable solvent or it may be a normally liquid resin to which is added either the phenol or methylene body depending upon which is required to react with the resin applied to the grains.

I claim:

1. The method of making an abrasive coated article which comprises coating abrasive grains with a solid permanently-fusible resin capable of becoming infusible by heating with a hardening agent, coating a backing with a heat-hardenable liquid resinous material containing a hardening agent for the permanently-fusible resin on the abrasive grains, applying a layer of the coated grains to the resin coat on the backing, and heating the coated backing to cause the resin on the grains to flow into the liquid coating on the backing and to harden the resins.

2. The method of making an abrasive coated article which comprises coating abrasive grains with a solid permanently-fusible phenolic resin capable of becoming infusible by heating with a hardening agent, coating a backing with a heat-hardenable liquid resinous material comprising a phenolic condensation product and a hardening agent for the permanently-fusible resin on the abrasive grains, applying a layer of the coated grains to the resin coat on the backing, and heating the coated backing to cause the resin on the grains to flow into the liquid coating on the backing and to harden the resins.

3. The method of making an abrasive coated article which comprises coating abrasive grains with a solid permanently-fusible phenolic condensation product resin containing excess phenol, coating a backing material with a liquid containing a methylene body, applying a substantially single layer of the resin coated grains to the liquid coat on the backing, and heating the article to cause the resin on the grains to flow onto the backing and to cause reaction between the resin and the liquid, whereby the resin is heat-hardened and the grains are adhesively attached to the backing by the hardened resin.

4. The method of making an abrasive coated article which comprises coating abrasive grains with a solid permanently-fusible phenolic condensation product resin containing excess phenol, coating a backing material with a heat-hardenable liquid comprising a phenolic condensation product and a methylene body, applying a substantially single layer of the resin coated grains to the liquid coated backing, and heating the article to cause the resin on the grains to flow onto the backing and to cause reaction between the resin and the liquid, whereby the resin is heat-hardened and the grains are adhesively attached to the backing by the hardened resin.

5. The method of making an abrasive coated article which comprises coating abrasive grains with a solid permanently-fusible phenolic condensation product resin containing excess phenol, coating a backing material with a normally liquid heat-hardenable phenolic condensation product containing a methylene body, applying a substantially single layer of the resin coated grains to the liquid coated backing, and heating the article to cause the resin on the grains to flow onto the backing and to cause reaction between the resin and the liquid, whereby the resin is heat-hardened and the grains are adhesively attached to the backing by the hardened resin.

6. The method of making an abrasive coated article which comprises coating abrasive grains with a solid permanently-fusible phenol-methylene condensation product resin containing excess methylene, coating a backing with a liquid containing free phenol, applying a substantially single layer of the coated grains to the liquid-coated backing, and heating the article to cause the resin on the grains to flow onto the backing and heat-harden.

7. The method of making an abrasive coated article which comprises coating abrasive grains with a solid permanently-fusible phenol-methylene condensation product resin containing excess methylene, coating a backing with a heat-hardenable liquid comprising a phenolic condensation product containing an excess of free phenol, applying a substantially single layer of the coated grains to the liquid coated backing, and heating the article to cause the resin on the grains to flow onto the backing and heat-harden.

8. The method of making an abrasive coated article which comprises coating abrasive grains with a solid permanently-fusible phenol-methylene condensation product resin containing excess methylene, coating a backing with a normally liquid phenolic condensation product containing free phenol, applying a substantially single layer of the coated grains to the liquid-coated backing, and heating the article to cause the resin on the grains to flow onto the backing and heat-harden.

OSBORNE L. MAHLMAN.